United States Patent [19]

Harper et al.

[11] Patent Number: 4,832,459
[45] Date of Patent: May 23, 1989

[54] BACKLIGHTING FOR ELECTRO-OPTICAL PASSIVE DISPLAYS AND TRANSFLECTIVE LAYER USEFUL THEREWITH

[75] Inventors: William P. Harper, South Killingly; Michael S. Lunt, Abbington, both of Conn.

[73] Assignee: Rogers Corporation, Rogers, Conn.

[21] Appl. No.: 60,931

[22] Filed: May 27, 1987

Related U.S. Application Data

[63] Continuation of Ser. No. 633,123, Jul. 20, 1984, abandoned, which is a continuation-in-part of Ser. No. 577,145, Feb. 6, 1984.

[51] Int. Cl.⁴ ............................................. G02F 1/13
[52] U.S. Cl. .................................... 350/345; 350/336; 350/338; 313/503
[58] Field of Search .................. 350/336, 338, 345; 313/503, 504, 505, 510, 511; 250/483.1, 486.1, 487.1; 252/503; 428/917; 427/66

[56] References Cited

U.S. PATENT DOCUMENTS

| | | | |
|---|---|---|---|
| 2,765,419 | 10/1956 | Roberts | 250/438.1 X |
| 2,866,057 | 12/1958 | Peck | 252/503 |
| 3,160,541 | 12/1964 | Wollentin | 156/67 |
| 3,315,111 | 4/1967 | Jaffe et al. | 313/511 X |
| 3,475,640 | 10/1969 | Litant et al. | 250/438.1 X |
| 3,850,631 | 11/1974 | Tamai | |
| 4,040,727 | 8/1977 | Ketchpel | 350/601 |
| 4,130,408 | 12/1978 | Crossland et al. | 350/344 X |
| 4,170,771 | 10/1979 | Bly | 350/345 X |
| 4,196,973 | 4/1980 | Hochstrate | 350/338 |
| 4,208,869 | 6/1980 | Hanaoka | 350/345 |
| 4,213,676 | 7/1980 | Kaufmann | 350/336 |
| 4,228,574 | 10/1980 | Culley et al. | 350/337 X |
| 4,294,518 | 10/1981 | O'Connor et al. | 350/335 X |
| 4,299,444 | 11/1981 | Romer | 350/278 |
| 4,355,868 | 10/1982 | Perregaux et al. | 350/338 |
| 4,417,174 | 11/1983 | Kojima et al. | |
| 4,490,282 | 12/1984 | Corby et al. | 252/503 |
| 4,499,451 | 2/1985 | Suzuki et al. | 350/283 |
| 4,500,173 | 2/1985 | Leibowitz | 428/917 X |

FOREIGN PATENT DOCUMENTS

| | | |
|---|---|---|
| 1059678 | 7/1979 | Canada . |
| 2355134 | 5/1975 | Fed. Rep. of Germany . |
| 2449602 | 4/1976 | Fed. Rep. of Germany . |
| 2722388 | 3/1979 | Fed. Rep. of Germany . |
| 2808260 | 8/1979 | Fed. Rep. of Germany ...... 350/278 |
| 2856170 | 6/1980 | Fed. Rep. of Germany . |
| 0828720 | of 1960 | United Kingdom .................. 427/66 |

Primary Examiner—Stanley D. Miller
Assistant Examiner—Napoleon Thantu

[57] ABSTRACT

In an electroluminescent lamp having a phosphor layer disposed between corresponding lamp electrodes adapted to apply an excitation potential to cause the phosphor layer to emit light, a front lamp electrode which, in addition to being light transmissive to radiation from the phosphor layer, consists of a thin layer of light-transmissive binder containing a distribution of discrete particles that are characteristically light-reflective and electrically conductive. The electrode particles provide aggregate diffuse outward reflectance sufficient to serve as a reflector behind an LCD display for ambient light that falls upon the LCD display to illuminate the display under light ambient conditions. Furthermore, the particles in the electrode layer are adapted to contribute to electrical continuity through the layer sufficient to apply excitation to the phosphor layer, and the electrode layer particles have sufficient spaces between them to provide escape-paths for light from the excited phosphor layer to back-illuminate the LCD display under dark ambient conditions. A method of forming the improved electrode, e.g. by shear transfer techniques, is also described. Certain aspects of the invention apply to the function of improved transflective layers, per se.

5 Claims, 2 Drawing Sheets

BACKLIGHTING FOR ELECTRO-OPTICAL PASSIVE DISPLAYS AND TRANSFLECTIVE LAYER USEFUL THEREWITH

This is a continuation of application U.S. Ser. No. 633,123, filed July 20, 1984, now abandoned, which is a continuation-in-part of application U.S. Ser. No. 577,145, filed Feb. 6, 1984.

BACKGROUND OF THE INVENTION

Passive liquid crystal display devices are made of a layer of liquid crystal disposed between opposed electrodes activatable in segments. Light passing into the device through the front electrode, which is transparent, is internally reflected from the back of the device, e.g. from a reflective film or coating. As is well known, the light entering at activated segments of the device is modified by the liquid crystals to provide a contrasting visual effect relative to other areas. To obtain a practical display that corresponds to the shape of the activated regions, a contrast ratio of about 2:1 is required where the display and background are of the same color. The contrast ratio varies proportionally with ambient light, assuming a constant electrode potential. For this reason, where liquid crystal devices are desired to be used at night or at low ambient light levels, efforts have been made to provide additional lighting.

Those suggestions which employ an incandescent light source, or other point light source, must contend with the problems of nonuniformity of illumination. Examples of Castleberry U.S. Pat. No. 4,212,048, which employs a transmissive diffuser; Brooks U.S. Pat. No. 4,206,501 and Eberhardt U.S. Pat. No. 4,229,783, which employ diffusers for bulbs located behind the display, Eberhardt having an additional reflective front surface to facilitate diffusion of the ambient light; and Borden, Jr., U.S. Pat. No. 3,748,018, which employs a reflector to direct light from the source onto the rear surface of the display.

Others have sought to employ electroluminescent lamps behind the display devices, with selective reflectivity provided in the ambient light mode by means of a dichroic wavelength selective reflector (Aldrich U.S. Pat. No. 3,869,195), or a microlouvered light control film (Myer U.S. Pat. No. 3,811,751) or by utilizing the reflective rear electrode of the EL lamp itself (Saurer et al. U.S. Pat. No. 4,138,195). These have various drawbacks such as substantial expense and lack of sufficient contrast in one or the other of the modes of operation.

It is an objective of this invention to provide a simple, low cost and effective device for uniformly illuminating, from the back, a passive liquid crystal display for viewing at night or under conditions of low ambient light by illumination from the rear; it is also an objective to provide a device useful with a passive liquid crystal display, to allow the display to be seen in all levels of light and darkness; a further objective is to provide an improved transflector and method for its fabrication.

SUMMARY OF THE INVENTION

Certain aspects of the invention relate to an electroluminescent lamp comprising a phosphor layer disposed between corresponding lamp electrodes that are adapted to apply an excitation potential to cause the phosphor layer to emit light, the front lamp electrode being light-transmissive to radiation from the phosphor layer. According to these aspects of the invention, the front lamp electrode comprises a thin layer of light-transmissive binder containing a distribution of discrete particles that are characteristically light-reflective and electrically conductive, the particles providing aggregate diffuse outward reflectance sufficient to serve as a reflector behind an LCD display for ambient light that falls upon the LCD display to illuminate the display under light ambient conditions, the particles in the layer being in sufficient electrical continuity, preferably as a result of particle-to-particle contact, to apply excitation to the phosphor layer, and the particles having sufficient spaces between them to provide outward escape-paths for light from the excited phosphor layer to back-illuminate the LCD display under dark ambient conditions.

In preferred embodiments, the particles in the front lamp electrode have diameters of the order of about 10 microns in the direction of the plane of the layer in which they reside; the particles in the front lamp electrode have the form of metal flakes, the particles being generally aligned, on average, with the plane of the layer in which they reside; the binder is a polymer consisting essentially of polyvinylidene fluoride (PVDF); the particle distribution in the front lamp electrode provides a reflectance of about 80 percent to ambient light incident upon the front of the electrode; and the lamp is adapted to emit radiation through the front lamp electrode of brightness of at least one foot-lambert.

According to another aspect of the invention, an electro-optical device is comprised of the combination of the electroluminescent lamp as described above with a display of an array of a large number of discrete LCD picture elements activatable selectively to form desired characters, the front lamp electrode being arranged to serve as a rear reflective surface for the LCD display under light ambient conditions, and the lamp being adapted to provide light through the front lamp electrode to back-illuminate the display under dark ambient conditions.

In preferred embodiments of this aspect of the invention, the average surface area of a particle in the front lamp electrode is less than about one percent of the surface area of a picture element, and the device is capable of providing, for all ambient conditions, a display contrast ratio of at least about 2:1.

Other aspects of the invention involve methods of forming the front electrode described above. In one aspect, the method comprises depositing upon the phosphor layer at least one thin layer of a suspension of light-transmissive polymer solid dispersed in a liquid phase containing a uniform dispersion of discrete particles that are characteristically light-reflective and electrically conductive, and causing the layer to fuse throughout to form a continuous electrode layer, the discrete particles of the electrode layer being uniformly distributed throughout and providing aggregate diffuse reflectance sufficient to serve as a reflector behind an LCD display for ambient light to illuminate the LCD display under light ambient conditions, these particles making sufficient contact with each other in their layer to provide electrical continuity sufficient to apply excitation to the phosphor layer, and the particles having sufficient spaces between them to enable escape of light from the excited phosphor layer through the front lamp electrode to back-illuminate the LCD display under dark ambient conditions.

In another aspect, the method of forming a transflective layer comprises depositing by shear transfer and drying at least one thin layer of a suspension of light transmissive polymer solid dispersed in a liquid phase, the layer containing a uniform dispersion of discrete particles that are characteristically light-reflective, and for use, e.g. as an electrode, electrically conductive, and the method including heating to fuse the polymer particles continuously throughout the extent of the layer. Preferably, the layer is deposited by shear transfer upon a fused first layer comprising the polymer solid, and the heating causes the layers to fuse continuously throughout and between the layers to form a monolithic unit; and the layer is deposited by silk screen printing or doctor blade coating.

In preferred embodiments of both methods, the discrete particles have the form of flakes and during the drying of the layer a large multiplicity of the particles are caused to generally align themselves with the extent of the plane of the thin layer; and the polymeric binder consists essentially of polyvinylidene fluoride (PVDF).

According to another aspect of the invention, a transflector comprises a thin layer of light-transmissive polymer binder consisting essentially of polyvinylidene fluoride (PVDF) containing a distribution of discrete particles that are characteristically light reflective, the particles in the layer providing aggregate diffuse reflectance.

Preferably, at least some of the particles are electrically conductive and serve to conduct electricity through the layer. In preferred embodiments, the transflector is provided in combination with an electroluminescent lamp, disposed over the phosphor layer of the lamp, and the layer serves at least in part as the front electrode of the lamp.

PREFERRED EMBODIMENT

We first briefly describe the drawings.

STRUCTURE AND OPERATION

Figure 1:
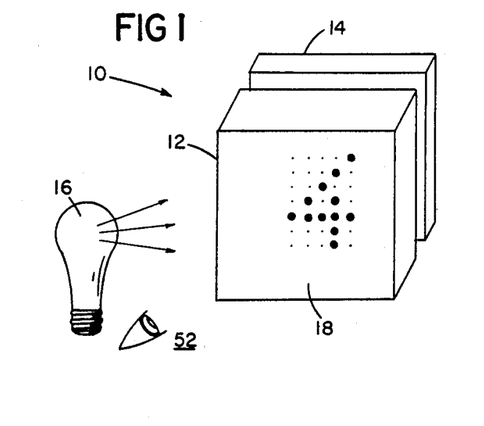
FIGS. 1 and 2 are diagrammatic perspective views of an electro-optical device according to the invention in light and dark ambient conditions, respectively.
Figure 1A:
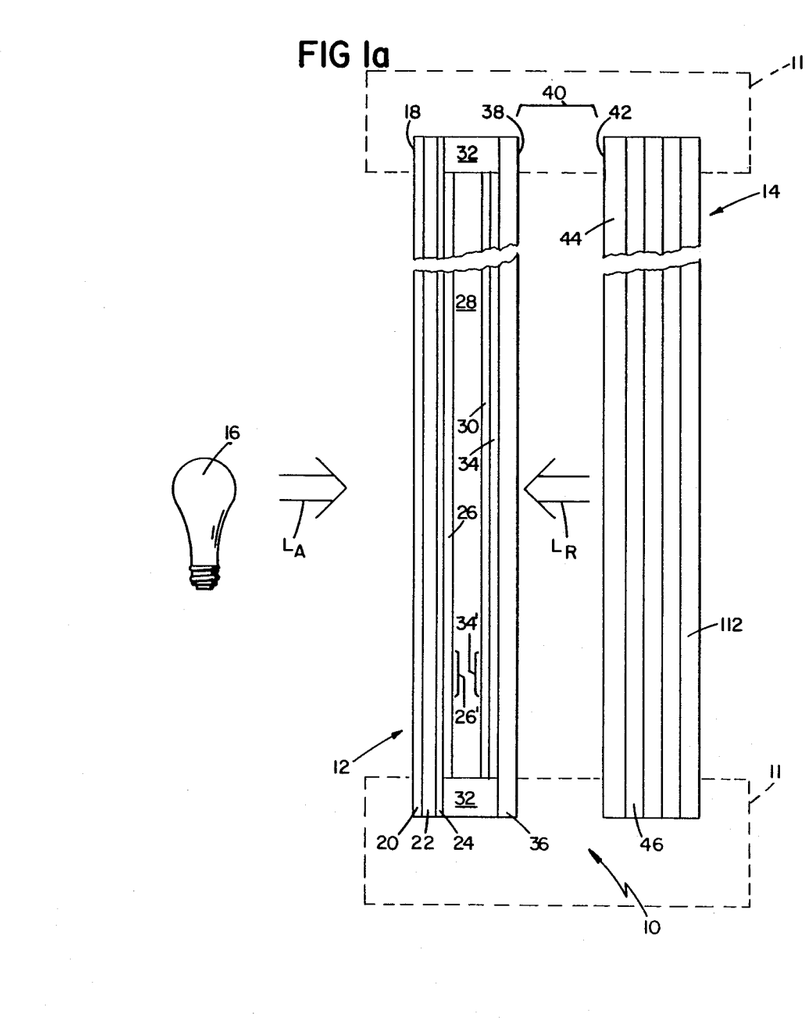
FIGS. 1a and 2a are diagrammatic edge views of the device of FIGS. 1 and 2.
Figure 2:
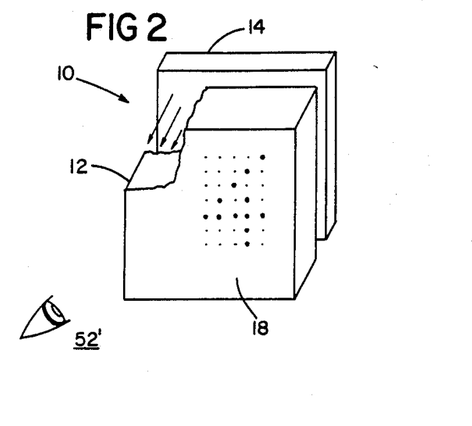

Referring to FIGS. 1 and 2, electro-optical device 10 comprises a typical liquid crystal display (LCD) 12 of the twisted nematic type, e.g. as described in Klein U.S. Pat. No. 3,612,654, and a correspondingly sized and shaped electroluminescent lamp 14. The lamp 14 and LCD 12 are held in a fixed relationship by frames 11, shown in dashed line in FIGS. 1a and 2a.

In FIG. 1, source 16 of ambient light is radiating light toward the front surface 18 of the LCD. Referring to FIG. 1a, ambient light rays, $L_A$, pass through, in sequence; anti-reflective coating 20, transparent front substrate 22, anti-reflective coating 24, transparent front display electrode 26, liquid crystal 28 (lying between the front electrode and passivating layer 30 in a compartment sealed about the periphery by gasket 32), transparent rear display electrode 34 and transparent rear substrate 36. The light rays passing out of the rear face 38 of the LCD cross gap 40, of about 0.005 inch, between display 12 and electroluminescent lamp 14, which is not activated, to enter the lamp via front surface 42, passing through lamp transparent protective layer 44 and into front electrode 46.

Figure 2A:
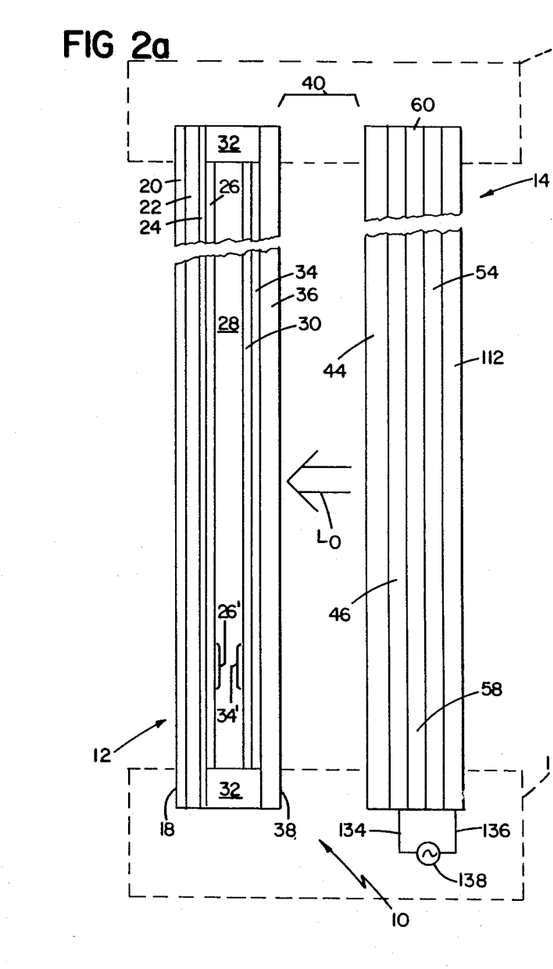
Figure 3:
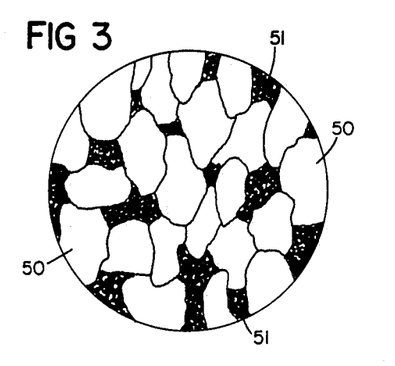
FIGS. 3 and 3a are plan and side section representations, respectively, of a magnified view of a portion of the front lamp electrode.
Figure 3A:
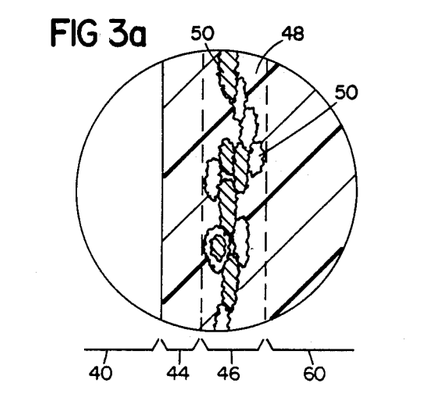

Referring to FIGS. 2, 2a, 3 and 3a, the front lamp electrode 46 is a layer comprised of a light-transmissive plastic binder 48 of, e.g., polyvinylidene fluoride (PVDF), and silver flakes 50 dispersed evenly throughout, the planes of the flakes being generally in alignment with the plane of extent of the electrode, see FIG. 3a, and presenting an aggregate frontal area of about 80 percent of the electrode area, with light-transmissive spaces 51 being defined between some of the flakes. The flakes are formed, e.g. by passing pellets through a ball or hammer milling process, thus preferably they are not uniformly smooth or flat, but have somewhat irregular, and bent surfaces similar to that of, e.g., cornflakes. The aggregate effect of such metal flakes in the layer is to provide diffuse reflectance, which is important to enable viewing of the LCD over the normal angular range.

Figure 4:
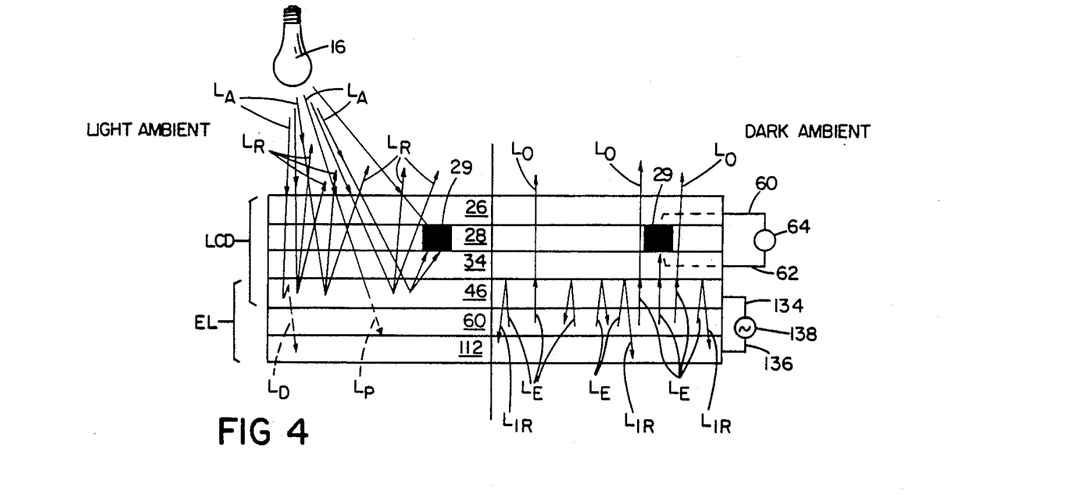
FIG. 4 is a diagrammatic representation of an electro-optical device of the invention showing light paths in light and dark ambient conditions.

For ease of illustration, in FIG. 4 only certain components of the electro-optical device are shown: for LCD 12, the front and rear transparent electrodes 26, 34, the liquid crystal layer 28, and the rear reflector layer 46, which is also the front electrode for lamp 14; for lamp 14, the phosphor-containing layer 60 disposed between front and rear lamp electrodes 46, 112.

Referring to FIGS. 1a and 4, the ambient light rays, $L_A$, that have passed through the LCD display penetrate through the binder of the front lamp electrode 46 until reflected by the surfaces of the silver flakes. While being generally aligned with the plane of the layer, the flakes are somewhat randomly distributed. They generally are of sufficient thickness to be opaque to visible light, i.e. they have thickness five (preferably substantially more) times the wavelength of visible light. The major portion of the ambient light rays, $L_A$, entering the front lamp electrode 46, e.g. about 80 percent, are reflected out of the electrode as reflected light rays, $L_R$. The semi-random distribution of the flakes and their irregular surfaces result in a general diffuse reflection of light over a range of angles that is suitable for LCD backlighting. Due to the open spaces 51, FIG. 3, between flakes, a minor portion, $L_P$, of the light rays passes through the electrode layer between flakes and is lost. A second minor portion, $L_D$, of the light rays that is reflected from the front surfaces of the silver flakes is re-reflected by the back surfaces of other flakes lying thereabove in the electrode layer, and also passes through spaces 51 of the electrode and is lost.

The reflected light rays, $L_R$, travel a reverse course to that of entering light, out of lamp electrode 46 and through the LCD 12. Light rays $L_R$ and $L_A$ that are incident upon activated sections 29 of the liquid crystals (activated through the action of corresponding segments 26', 34' of the front and rear display electrodes 26, 34, powered by connecting wires 60, 62 from controlled source 64), are relatively modified in a manner well-known in LCD technology to generate to the observer 52 a contrasting light and dark display.

A large multiplicity of discrete LCD picture elements ("pixels") activatable according to a predetermined pattern form desired characters. For example, in FIGS. 1 and 2, 5 by 7 pixel grids are shown, with 12 pixels in the grid activated to display the numeral "4". Each pixel is about 300 microns in diameter. As the silver flake particles 50 have average diameter of between about 5 and 10 microns (compared to thickness between about 0.25 and 2.0 microns) and surface areas well less than about one percent of the surface area of each pixel, the electrode of the corresponding portion of the EL lamp includes a very large multiplicity of tiny reflective surfaces and open passages. Thus the resulting display is created by the combined reflectance (or emittance) of a large number of elements, to achieve desired resolution. The results are further improved by the diffuseness of the reflectance from the particles, the diameter of the flakes, in fact, being much less than the discrete surfaces of certain diffusers that heretofore have been employed with LDCs.

In FIG. 2, the electro-optical device 10 is shown in dark ambient conditions, with no light rays directed toward the front surface 18 of the LCD 12. Referring also to FIGS. 2a and 4, the electroluminescent lamp 14 has been activated by applying an electrical potential (from source 138 via connecting wires 134, 136) between front lamp electrode 46, described above, and rear lamp electrode 112, across the electroluminescent layer 60 of phosphor particles 56 uniformly dispersed in PVDF binder 58. (The electroluminescent layer is separated from the rear electrode 112 by an insulator layer 54 (FIG. 2a) comprises of barium titanate particles dispersed in PVDF binder.) Referring to FIGS. 3 and 3a, the silver flake particles are present in a quantity to make sufficient edge-to-edge contact in the layer to provide adequate electrical continuity to apply electrical excitation to the phosphor layer. Thus excited, the phosphor particles emit light rays, $L_E$, a portion of which, having brightness between about 5 to 100 ft-lamberts, enter the front lamp electrode 46. Referring again to FIG. 4, many of the light rays, $L_{IR}$, again about 80 percent, entering the electrode are internally reflected back into the phosphor layer; however, a sufficient portion of the light rays, $L_O$, having brightness of about 1 to 5 ft-lamberts, passes out of the electrode into the protective layer. Rays $L_O$ pass across gap 40, enter LCD 12 via rear surface 38, and then proceed through rear display substrate 36, transparent rear electrode 34, passivating layer 30, liquid crystals 28 (being affected by the activated segments), transparent front display electrode 26 and transparent front substrate 22 with its anti-reflective coatings 20, 24. Observer 52' (FIG. 2) in darkness again observes a contrasting light and dark display.

CONTRAST EVALUATION

To be noticeable to an observer, the light and dark areas of the display must have a minimum level of contrast, e.g. a contrast ratio of 2:1 typically is sufficient.

To establish the efficiency of the device described above, the contrast ratio of light to dark areas of display was evaluated under different ambient light conditions and compared to the performance of the same model LCD with a standard metallized foil reflector on the rear surface.

Measurements were conducted using a Pritchard Photometer, Model 1980A-OP, with the photo-optic setting open and the focus spot at 6 degrees, under four conditions of ambient light: darkened room with black walls (photo darkroom), closed room with the lights off, closed room with ceiling lights on, and under bright direct lighting (desk lamp). The level of ambient light present during each of the four tests was determined, then the photometer test spot was focused sequentially on the dark display area and on the light reflective background and the contrast ratio calculated. The results of the evaluation are summarized in Table A. In all tests, the display was powered at 60 volts, 400 hertz. In Tests 1 and 2, the lamp was powered at 115 volts, 1000 hertz; in Tests 3 and 4, the lamp was turned off.

TABLE A

| | Standard LCD | LCD/EL Device(10) |
|---|---|---|
| Test 1 - Complete Darkness Background Light 0 ft-Lamberts | | |
| Character Area (Dark) | 0 | 0.21 |
| Backplane (Light) | 0 | 0.59 |
| Contrast Ratio | 0 | 2.8:1 |
| Test 2 - Semi-Darkness Background Light 0.90 ft-Lamberts | | |
| Character Area (Dark) | 0.20 | 0.25 |
| Backplane (Light) | 0.42 | 0.75 |
| Contrast Ratio | 2.1:1 | 3.0:1 |
| Test 3 - Low Light Background Light 32.0 ft-Lamberts | | |
| Character Area (Dark) | 1.48 | 0.83 |
| Backplane (Light) | 4.65 | 3.10 |
| Contrast Ratio | 3.1:1 | 3.7:1 |
| Test 4 - Bright Light Background Light 150-200 ft-Lamberts | | |
| Character Area (Dark) | 21.0 | 9.8 |
| Backplane (Light) | 82.0 | 47.0 |
| Contrast Ratio | 3.9:1 | 4.8:1 |

As shown, the display on device 10 of the invention was observable at all external light levels, while the display on the standard LCD has borderline contrast in semi-darkness, i.e. dark ambient conditions, and could not be seen when there was no ambient light.

LAMP MANUFACTURE

Referring to FIG. 2a, we now describe an electroluminescent lamp 14 formed of a superposed series of the layers including the novel reflective-transmissive conductive front electrode 46 of the invention.

The substrate 112 used in this lamp configuration was copper (0.0014 inch thick, one ounce) cut to size and shape corresponding to that of the LCD device 12 with which the lamp was to be used, e.g. 3 inches by 4 inches.

DIELECTRIC INSULATING LAYER (54)

A coating composition for forming dielectric layer 54 upon the substrate 112, in this case to act as an insulator between the substrate/electrode 112 and the overlying light-emitting phosphor layer 60 (described below), was prepared as follows:

To prepare the dielectric composition, 10 grams of a PVDF dispersion of 45 percent, by weight, polyvinylidene fluoride (PVDF) in a liquid phase believed to be primarily carbitol acetate (diethyl glycol monoethyl ether) were measured out. This dispersion was obtained commercially from Pennwalt Corporation under the tradename "Kynar Type 202". As the electrical property-imparting additive, 18.2 grams of barium titanate particles (BT206 supplied by Fuji Titanium, having a particle size of less than about 5 microns) were mixed into the PVDF dispersion. An additional amount of carbitol acetate (4.65 grams) was added to the composition to maintain the level of solids and the viscosity of the composition at a proper level to maintain uniform dispersion of the additive particles while preserving the desired transfer performance. It was observed after mixing that the composition was thick and creamy and that the additive particles remained generally uniformly suspended in the dispersion without significant settling during the time required to prepare the example. This is due, at least in part, to the number of solid PVDF particles (typically about 2 microns in diameter) present in the composition.

The composition was poured onto a 320 mesh polyester screen positioned 0.145 inch above the substrate, selected for its resistance to the carrier fluid employed and for its ability to withstand the extreme temperatures of treatment, e.g. up to 500° F., as described below. Due to its high apparent viscosity, the composition remained on the screen without leaking through until the squeegee was passed over the screen, exerting shear stress on the fluid composition causing it to shear-thin due to its thixotropic character and pass through the screen to be printed, forming a thin layer on the substrate below. The deposited layer was subjected to drying for 2½ minutes at 175° F. to drive off a portion of the liquid phase, and was then subjected to heating to 500° F. (above the initial melting point of the PVDF) and was maintained at that temperature for 45 seconds. This heating drove off remaining liquid phase and also fused the PVDF into a continuous smooth film on the substrate.

The resulting thickness of the dried polymeric layer was 0.35 mil ($3.5 \times 10^{-4}$ inch).

A second layer of the composition was screen-printed over the first layer on the substrate. The substrate now coated with both layers was again subjected to heating as above. This second heating step caused the separately applied PVDF layers to fuse together. The final product was a monolithic dielectric unit having a thickness of 0.7 mil with no apparent interface between the layers of polymer, as determined by examination of a cross-section under microscope. The particles of the additive were found to be uniformly distributed throughout the deposit.

The monolithic unit 54 was determined to have a dielectric constant of about 30.

LIGHT EMITTING PHOSPHOR LAYER (60)

A coating composition for forming the light emitting phosphor layer 60 was prepared as follows:

To prepare the composition, 18.2 grams of a phosphor additive, zinc sulfide crystals (type #723 from GTE Sylvania, smoothly rounded crystals having particle size of about 15 to 35 microns) were introduced to 10 grams of the PVDF dispersion used above. It was again observed after mixing that despite the smooth shape and relatively high density of the phosphor crystals, the additive particles remained uniformly suspended in the dispersion during the remainder of the process without significant settling.

The composition was superposed by screen printing over the underlying insulator layer 54 through a 280 mesh polyester screen positioned 0.145 inch above the substrate to form a thin layer. The deposited layer was subjected to the two stage drying and fusing procedure described above. Subjecting the layers to temperatures above the melting temperature of the PVDF material caused the PVDF to fuse throughout the newly applied layer and between the layers to form a monolithic unit upon the substrate 112. However, the interpenetration of the material of the adjacent layers having different electrical properties was limited by the process conditions to less than about 5 percent of the thickness of the thicker of the adjacent layers, i.e. to less than about 0.06 mil so that the different electrical property-imparting additive particles remained stratified within the monolithic unit as well as remaining uniformly distributed throughout their respective layers.

The resulting thickness of the dried polymeric layer was 1.2 mils ($1.2 \times 10^{-3}$ inch).

The deposited film was tested and found to be uniformly photoluminescent, without significant light or dark spots.

TRANSFLECTIVE/CONDUCTIVE FRONT LAMP ELECTRODE (46)

The coating composition for forming the novel transflective/conductive front lamp electrode 46 of the invention was prepared as follows:

To prepare this conductive composition, 13.52 gram of silver flake (Metz silver Flake #7 from Metz Metallurgical Corporation, So. Plainfield, NJ, having Scott apparent density of 27.2 gm/in$^3$ and TAP density by Tap-Pak of 3.1 gm/cc) were added to 55.80 grams of the PVDF dispersion used above. It was again observed after mixing that the additive particles remained uniformly suspended in the dispersion during the remainder of the process without significant settling.

The composition was superposed by the screen printing through a 320 mesh polyester screen positioned 0.15 inch above the light-emitting phosphor layer 60. The substrate with the multiple layers coated thereupon was again heated to above the PVDF melting temperature to cause the transflective/conductive front electrode layer to fuse throughout to form a continuous uniform layer and to fuse this layer together with the underlying light-emitting layer to form a monolithic unit. The front electrode layer thus formed is adapted to serve as both a conductor and as a reflector, and as the flakes are uniformly dispersed throughout the binder, a level of light transmissivity is achieved through the deposited layer.

The resulting thickness of the dried polymeric layer was 0.5 mil ($0.5 \times 10^{-3}$ inch).

The deposited layer was tested and found to have conductivity of 125 ohm-cm, and have light transmissivity of about 1-5 ft-Lamberts, about 80% of the transmissivity anticipated of an EL lamp of similar construction with a light transmissive, indium-oxide-containing, transparent front electrode.

CONDUCTIVE BUSS

The coating composition for forming a conductive buss 120 to distribute current via relatively short paths to the electrode was prepared as follows:

To prepare this conductive composition, 15.76 grams of silver flake (from Metz Metallurgical Corporation, of 325 mesh #7 particle size) were added to 10 grams of the PVDF dispersion used above. The particles remained uniformly suspended in the dispersion during the remainder of the process without significant settling.

The composition was screen printed through a 320 mesh polyester screen positioned 0.15 inch above semi-transparent upper electrode 46 as a thin narrow bar extending along one edge of the electrode layer. The deposited layer was subjected to the two stage drying and fusing procedure described above to fuse the PVDF into a continuous smooth film with the silver flake uniformly distributed throughout.

The resulting thickness of the dried polymeric layer was 0.3 mil ($0.3 \times 10^{-3}$ inch).

The deposited film was tested and found to have conductivity of $10^{-3}$ ohm-cm.

This construction with connecting wires 134, 136 (FIG. 2a) and a power source 138, forms a functional electroluminescent lamp 14. Electricity is applied to the lamp via the wires and is distributed by the buss layer to the upper electrode 46 to excite the phosphor crystals in the underlying layer 60, which causes them to emit light.

Due, however, to the damaging effect of moisture on phosphor layer 60, it is desirable to add a moisture impervious protective and insulative layer 44 about the exposed surfaces of the layers of the lamp to seal to the peripheral surface of the substrate 112. This layer 44 is also formed according to the invention, as follows:

PROTECTIVE-INSULATIVE LAYER (44)

The light transmissive, i.e., clear, PVDF dispersion employed above, devoid of electrical-property additives, is screen printed over the exposed surfaces of the lamp 14 through a 180 mesh polyester screen. The lamp was dried for two minutes at 175° F. and heated for 45 seconds at 500° F. The coating and heating procedure was performed twice to provide a total dried film thickness of protective-insulative layer 44 of 1.0 mils. (By using PVDF as the binder material in this and all the underlying layers, each layer has the same processing requirements and restrictions. Thus the upper layers, and the protective coating, may be fully treated without damage to underlying layers, as might be the case if other different binder systems were employed.)

The final heating step results in an electroluminescent lamp 14 of cross-section as shown in the figures. The polymeric material that was superposed in layers upon flexible substrate 112 has fused within the layers and between the layers to form a monolithic unit about 3.4 mils thick that flexes with the substrate. As all the layers are formed of the same polymeric material, all the layers of the monolithic unit have common thermal expansion characteristics, hence temperature changes during testing did not cause delamination. Also, due to the continuous film-like nature of each layer due to the fusing of its constituent particles of PVDF and the interpenetration of the polymeric material in adjacent layers, including the protective layer 44 covering the top and exposed side surfaces, the lamp is highly resistant to moisture during high humidity testing, and the phosphor crystals did not appear to deteriorate prematurely, as would occur if moisture had penetrated to the crystals in the phosphor layer.

OTHER EMBODIMENTS

Numerous other embodiments are within the following claims, as will be obvious to one skilled in the art.

The electroluminescent lamp may be selectively powered independently of the LCD, or may be powered via the same switch so the lamp is activated at all times while the LCD is on. In this state, the light rays emitted by the phosphor layer 60 and passing through the front lamp electrode 46 will supplement the reflected light rays, $L_R$, and, at least in part, replace light ray, $L_D$ and $L_P$, lost through the electrode.

Other materials have sufficient conductivity and reflectivity for use according to the invention. These include, e.g., copper and bronze. Silver coated beads might also be employed. Where it is desirable to increase the conductivity of the electrode without significantly affecting the reflectivity, semi-transparent conductive particles, e.g. indium oxide, may be added to the binder material. Indium oxide or other semi-transparent conductive material might also be used where the level of silver flake present does not provide adequate physical flake-to-flake contact for electrical continuity through the electrode layer, the indium oxide particles acting to conduct current between the flakes.

A further reflective-transmissive-conductive layer might also be formed, e.g. over the flake-containing layer, as a thin layer of metal, e.g., applied by sputtering or evaporation to a front surface of the EL lamp.

A transflective layer having limited or no electrical conductivity may also be formed according to the invention, e.g. for use with another front lamp electrode to improve light transmission and electrical conductivity.

The protective layer 44 of the electroluminescent lamp may be applied as preformed film of PVDF under pressure of 125 pounds per square inch, and the lamp heated at 350° F. for one minute and then cooled while still under pressure. Each separate layer applied may have a dry thickness of as much as 0.010 inch, although thickness in the range between about 0.003 inch to 0.0001 inch is typically preferred. Similarly the conductive layer 46 may be formed on the pre-formed protective layer.

As mentioned, the composition for the transflective layer 46 as well as for other layers may be applied by screen printing, or by various of the doctor blade coating techniques, e.g. knife over roll or knife over table, or by other means. The shear-imparting conditions of screen printing may also be varied, e.g. the squeegee may be advanced along the screen at rates between about 2 and 200 inches per minute, and the size of the screen orifices may range between about 1.4 and 7 mils on a side.

While materials which consist essentially of homopolymers of PVDF are preferred, other materials may be employed. The guiding criteria for selection are low moisture absorptivity, ability of particles to fuse at elevated temperature to form a continuous moisture barrier film, and, when applied to flexible substrate, flexibility and strength.

The liquid phase of the composition may be selected from the group of materials categorized in the literature as "latent solvents" for PVDF, i.e., those with enough affinity for PVDF to solvate the polymer at elevated temperature, but in which at room temperature PVDF is not substantially soluble, i.e., less than about 5 percent. These include: methyl isobutyl ketone (MIBK), butyl acetate, cyclohexanone, diacetone alcohol, diisobutyl ketone, butyrolactone, tetraethyl urea, isophorone, triethyl phosphate, carbitol acetate, propylene carbonate, and dimethyl phthalate.

Where additional solvation is desired, a limited amount of "acetive" solvent which, in greater concentrations can dissolve PVDF at room temperature, e.g., acetone, tetrahydrofuran (THF), methyl ethyl ketone (MEK), dimethyl formamide (DMF), dimethyl acetamide (DMAC), tetramethyl urea and trimethyl phosphate, may be added to the carrier. Such a limited amount is believed to act principally in the manner of a surfactant, serving to link between the PVDF polymer particles and the predominant liquid phase, thus to stabilize the PVDF powder dispersion.

As will also be obvious to a person skilled in the art, the viscosity and weight percent of PVDF solids in the coating composition may also be adjusted, e.g. to provide the desired viscosity, suspendability and transfer characteristic to allow the composition to be useful with additive particles of widely different physical and electrical characteristics.

What is claimed is:

1. An electro-optical display device comprising an electroluminescent lamp having a phosphor layer disposed between corresponding lamp electrodes that are adapted to apply an excitation potential to cause said phosphor layer to emit light, the front lamp electrode being light-transmissive to radiation from said phosphor layer, and, positioned in front of said front electrode, a passive liquid crystal display device having a display defined by an array of a large number of discrete picture elements activatable selectively to form desired characters, said front lamp electrode comprising a thin layer of a light-transmissive, non-crosslinked, polyvinylidene fluoride binder containing a uniform distribution of discrete metal flakes in sufficient electrical contact with each other to at least assist in applying said excitation potential to said phosphor layer, said flakes characterized as being spaced apart from each other and having diameters between 5 and 10 μm in the direction of the plane of the layer in which they reside and surfaces that are not uniformly flat or smooth, all so as to create a large multiplicity of tiny, diffusely reflective surfaces that reflect a sufficient amount of light to illuminate said liquid crystal display under light ambient conditions and a large multiplicity of open passages between said reflective surfaces that permit light to escape from said phosphor layer through said front lamp electrode in an amount sufficient to back-illuminate said liquid crystal display under dark ambient conditions.

2. The electro-optical device of claim 1 characterized as providing, for all ambient conditions, a display contrast ratio of at least about 2:1.

3. In an electroluminescent lamp comprising a phosphor layer disposed between corresponding lamp electrodes that are adapted to apply an excitation potential to cause said phosphor layer to emit light, the front lamp electrode being light-transmissive to radiation from said phosphor layer, the improvement wherein said front lamp electrode comprises a thin layer of a light-transmissive, non-crosslinked, polyvinylidene fluoride binder containing a uniform distribution of discrete metal flakes in sufficient electrical contact with each other to at least assist in applying said excitation potential to said phosphor layer, said flakes characterized as being spaced apart from each other and having diameters between 5 and 10 μm in the direction of the plane of the layer in which they reside and having surfaces that are not uniformly flat or smooth, all so as to create a large multiplicity of tiny, diffusely reflective surfaces that reflect a sufficient amount of light to illuminate a liquid crystal display under light ambient conditions and a large multiplicity of open passages between said reflective surfaces that permit light to escape from said phosphor layer through said front lamp electrode in an amount sufficient to back-illuminate a liquid crystal display under dark ambient conditions.

4. The electroluminescent lamp of claim 3 wherein the amount of light reflected from said front lamp electrode is about 80 percent of the ambient light incident upon the front of said electrode.

5. The electroluminescent lamp of claim 3 wherein the light emitted through said front lamp electrode has a brightness of at least one foot-lambert.

* * * * *

UNITED STATES PATENT AND TRADEMARK OFFICE
CERTIFICATE OF CORRECTION

PATENT NO. : 4,832,459

DATED : May 23, 1989

INVENTOR(S) : Harper et al

Page 1 of 2

It is certified that error appears in the above-identified patent and that said Letters Patent is hereby corrected as shown below:

U.S. Patent Documents: The following nine references cited by us in an Information Disclosure Statement on July 20, 1984 (referring to abandoned application 633,123) are missing:

```
3,612,654  10/1971  Klein et al.,   350/160
3,748,018   7/1973  Borden, Jr.,    350/160
3,811,751   5/1974  Myer            350/160
3,869,195   3/1975  Aldrich et al   350/160
4,093,356   6/1978  Bigelow         350/338
4,093,357   6/1978  Jacobson et al  350/338
4,138,195   2/1979  Saurer et al    350/345
4,206,501   6/1980  Brooks          362/293
4,212,048   7/1980  Castleberry     362/19
```

U.S. Patent Documents: The following three references cited by us in a supplementary Information Disclosure Statement on October 5, 1984 (referring to abandoned application 633,123) are missing:

```
3,421,037  1/1969   Dymon           313/108
4,159,559  7/1979   Robinson, Sr.   29/25.14
4,455,324  6/1984   Kamijo et al.   427/66
```

Also, 4,417,174 is listed on above Supplementary Information Disclosure Statement as "Kamijo et al. 313/502". On other forms and on patent it's listed as "Kojima et al." with no class/subclass.

Col. 1, line 34, "Eberhardt U.S. Pat. No. 4,229,783" is not listed among cited references.

UNITED STATES PATENT AND TRADEMARK OFFICE
CERTIFICATE OF CORRECTION

PATENT NO. : 4,832,459

DATED : May 23, 1989

INVENTOR(S) : Harper et al

It is certified that error appears in the above-identified patent and that said Letters Patent is hereby corrected as shown below:

Col. 3, lines 20-21, bad break on "tran-sflector". Should be --trans-flector--.

Signed and Sealed this

Thirteenth Day of February, 1990

*Attest:*

JEFFREY M. SAMUELS

*Attesting Officer*     *Acting Commissioner of Patents and Trademarks*